(12) United States Patent
Ahuja et al.

(10) Patent No.: US 11,586,854 B2
(45) Date of Patent: Feb. 21, 2023

(54) DEVICES AND METHODS FOR ACCURATELY IDENTIFYING OBJECTS IN A VEHICLE'S ENVIRONMENT

(71) Applicant: Intel Corporation, Santa Clara, CA (US)

(72) Inventors: Nilesh Ahuja, Cupertino, CA (US); Ibrahima Ndiour, Portland, OR (US); Javier Felip Leon, Hillsboro, OR (US); David Gomez Gutierrez, Tlaquepaque (MX); Ranganath Krishnan, Hillsboro, OR (US); Mahesh Subedar, Lavee, AZ (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 16/830,341

(22) Filed: Mar. 26, 2020

(65) Prior Publication Data
US 2020/0226430 A1   Jul. 16, 2020

(51) Int. Cl.
*G06K 9/00*   (2022.01)
*G06K 9/62*   (2022.01)
(Continued)

(52) U.S. Cl.
CPC ....... *G06K 9/6265* (2013.01); *B60W 60/0016* (2020.02); *G05B 13/027* (2013.01);
(Continued)

(58) Field of Classification Search
CPC .. G06K 9/6265; G06K 9/6257; G06K 9/6254; G06K 9/6256; G06K 9/6263; G06K 9/6278; B60W 60/0016; G05B 13/027; G05B 13/048; G05B 2219/21002; G05B 2219/32335; G05B 2219/33027; G05B 2219/39271; G05D 1/0088; G05D 1/0214; G05D 1/0221; G05D 2201/0213; G06N 3/084; G06N 3/0445; G06N 3/0454;
(Continued)

(56) References Cited

U.S. PATENT DOCUMENTS

| 2015/0064668 | A1* | 3/2015 | Manci | G09B 5/00 |
| | | | | 434/219 |
| 2018/0067490 | A1* | 3/2018 | Pollach | G06V 10/95 |

(Continued)

OTHER PUBLICATIONS

Partial European Search Report issued for the European patent application No. 20204938.3, dated Apr. 29, 2021, 14 pages (for informational purposes only).

(Continued)

*Primary Examiner* — Charlotte M Baker
(74) *Attorney, Agent, or Firm* — Viering, Jentschura & Partner mbB

(57) ABSTRACT

Vehicle navigation control systems in autonomous driving rely on accurate predictions of objects within the vicinity of the vehicle to appropriately control the vehicle safely through its surrounding environment. Accordingly this disclosure provides methods and devices which implement mechanisms for obtaining contextual variables of the vehicle's environment for use in determining the accuracy of predictions of objects within the vehicle's environment.

18 Claims, 15 Drawing Sheets

(51) Int. Cl.

| | |
|---|---|
| *G05B 13/04* | (2006.01) |
| *G06N 3/084* | (2023.01) |
| *G05D 1/00* | (2006.01) |
| *G05D 1/02* | (2020.01) |
| *B60W 60/00* | (2020.01) |
| *G05B 13/02* | (2006.01) |
| *G06V 20/20* | (2022.01) |
| *G06V 20/58* | (2022.01) |
| *G06V 40/10* | (2022.01) |

(52) U.S. Cl.
CPC ......... *G05B 13/048* (2013.01); *G05D 1/0088* (2013.01); *G05D 1/0214* (2013.01); *G05D 1/0221* (2013.01); *G06K 9/6257* (2013.01); *G06N 3/084* (2013.01); *G06V 20/20* (2022.01); *G06V 20/58* (2022.01); *G06V 40/103* (2022.01); *G05D 2201/0213* (2013.01)

(58) Field of Classification Search
CPC ...... G06N 3/0472; G06N 3/088; G06N 5/003; G06N 20/10; G06N 20/20; G06N 7/005; G06N 20/00; G06V 20/20; G06V 20/58; G06V 40/103; G06V 10/82; G06V 20/70; G06V 10/774; G06V 10/7784; G06V 10/7788
USPC .......................................... 382/103; 434/219
See application file for complete search history.

(56) References Cited

U.S. PATENT DOCUMENTS

| | | | | |
|---|---|---|---|---|
| 2019/0033862 | A1* | 1/2019 | Groden | G08G 5/0086 |
| 2020/0004259 | A1 | 1/2020 | Gulino et al. | |
| 2021/0383695 | A1* | 12/2021 | Kose Cihangir | H04W 4/029 |

OTHER PUBLICATIONS

Kendall, Alex et al., "What Uncertainties Do We Need in Bayesian Deep Learning for Computer Vision?", Dec. 2017, pp. 5580-5590, 31st Conference on Neural Information Processing Systems (NIPS 2017), Long Beach, CA, USA.

Subedar et al., "Uncertainty-aware Audiovisual Activity Recognition using Deep Bayesian Variational Inference", 2019 IEEE/CVF International Conference on Computer Vision (ICCV), Oct. 2019, 10 pages, Seoul, South Korea.

Amazon Web Services, "Amazon SageMaker: Developer Guide", published Jun. 26, 2018, 1605 pages.

Malisiewicz et al., "Beyond Categories: The Visual Memex Model for Reasoning About Object Relationships", NIPS'09: Proceedings of the 22nd International Conference on Neural Information Processing Systems 2009, published Dec. 2009, 9 pages, Vancouver, British Columbia, Canada.

Sekachev et al.; "Computer Vision Annotation Tool: A Universal Approach to Data Annotation"; https://software.intel.com/en-us/articles/computer-vision-annotation-tool-a-universal-approach-to-data-annotation; retrieved on Mar. 26, 2020, 20 pages.

Amazon Web Services; "Automate Data Labeling"; https://docs.aws.amazon.com/sagemaker/latest/dg/sms-automated-labeling.html; retrieved on Mar. 26, 2020, 4 pages.

Galleguillos et al., "Object Categorization using Co-Occurrence, Location and Appearance", IEEE Computer Society Conference on Computer Vision and Pattern Recognition (CVPR 2008), published Jun. 2008, 8 pages, Anchorage, Alaska, USA.

Parisi et al., "Continual Lifelong Learning with Neural Networks: A Review", Neural Networks: the Official Journal of the International Neural Network Society, published May 2019, 29 pages, vol. 113.

Seide et al., "Conversational Speech Transcription Using Context-Dependent Deep Neural Networks", 12th Annual Conference of the International Speech Communication Association, published Jan. 2011, 4 pages, Florence, Italy.

* cited by examiner

| $S_1$ | $S_2$ | ... | $C_1$ | $C_2$ | P(S, C) |
|---|---|---|---|---|---|
| $a_1$ | $b_1$ | ... | | | $p_1$ |
| $a_1$ | $b_1$ | ... | | | $p_2$ |
| ... | ... | ... | ... | ... | ... |
| $a_n$ | $b_m$ | ... | | | $p_{N-1}$ |
| $a_n$ | $b_m$ | ... | | | $p_N$ |

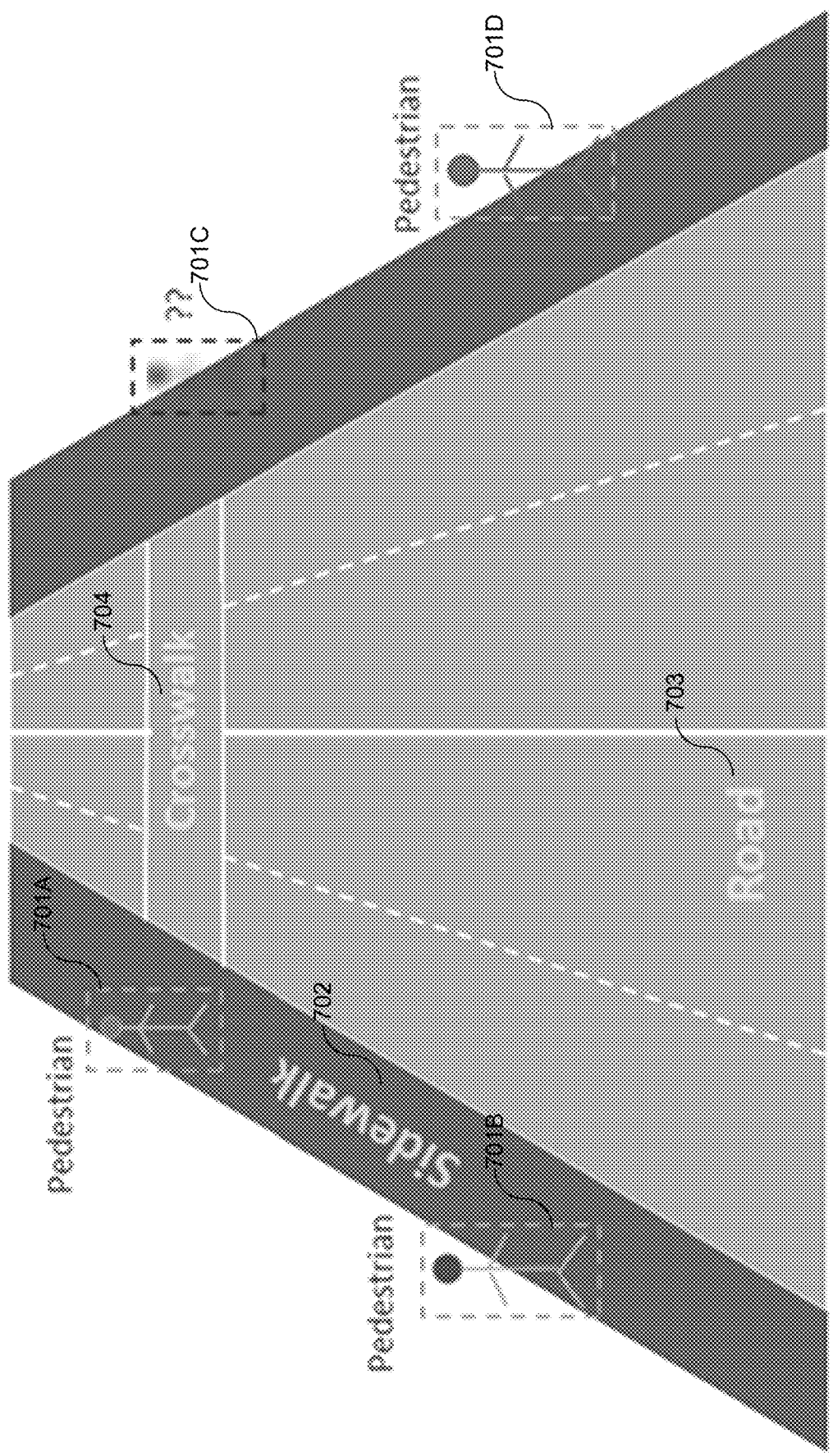

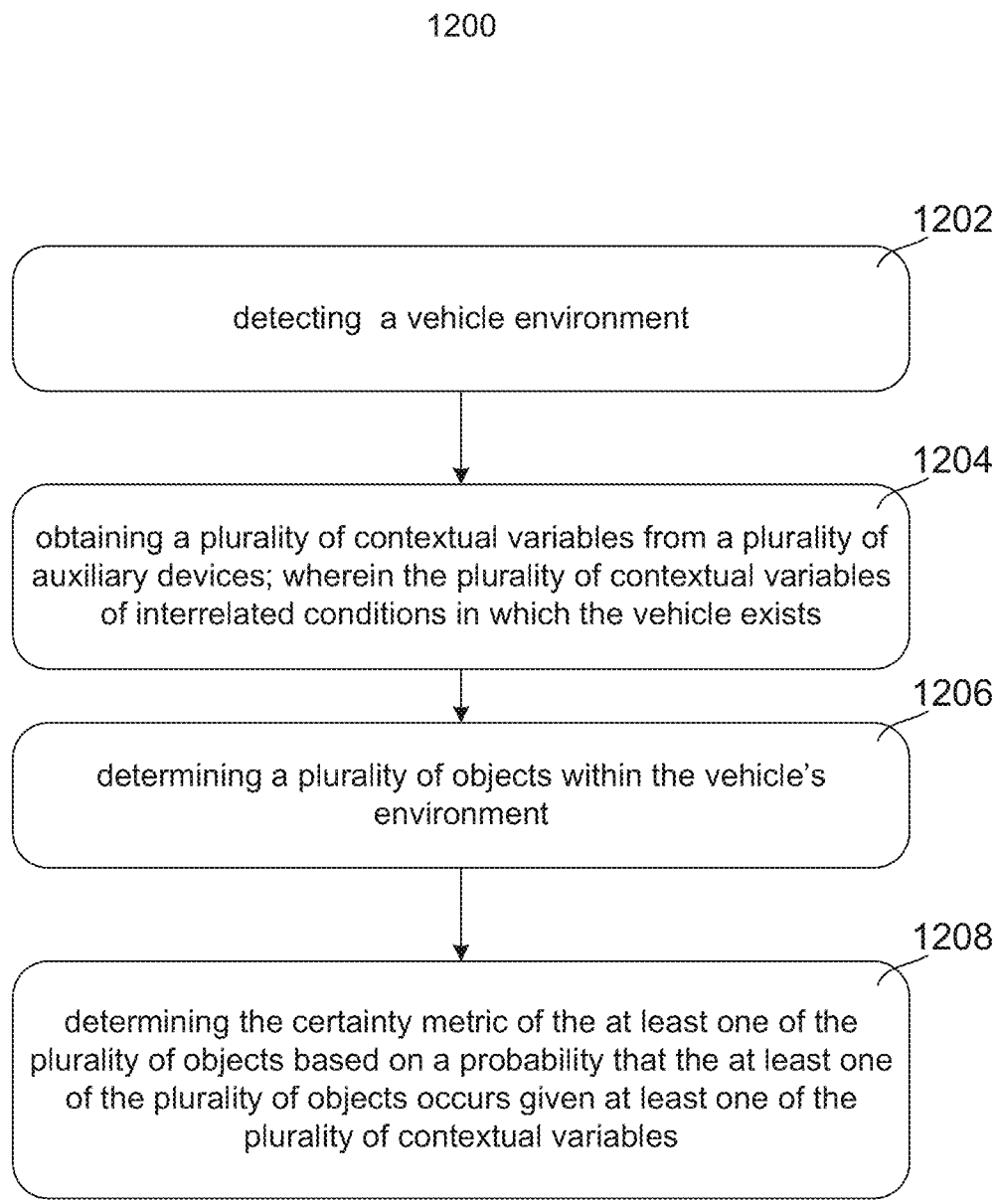

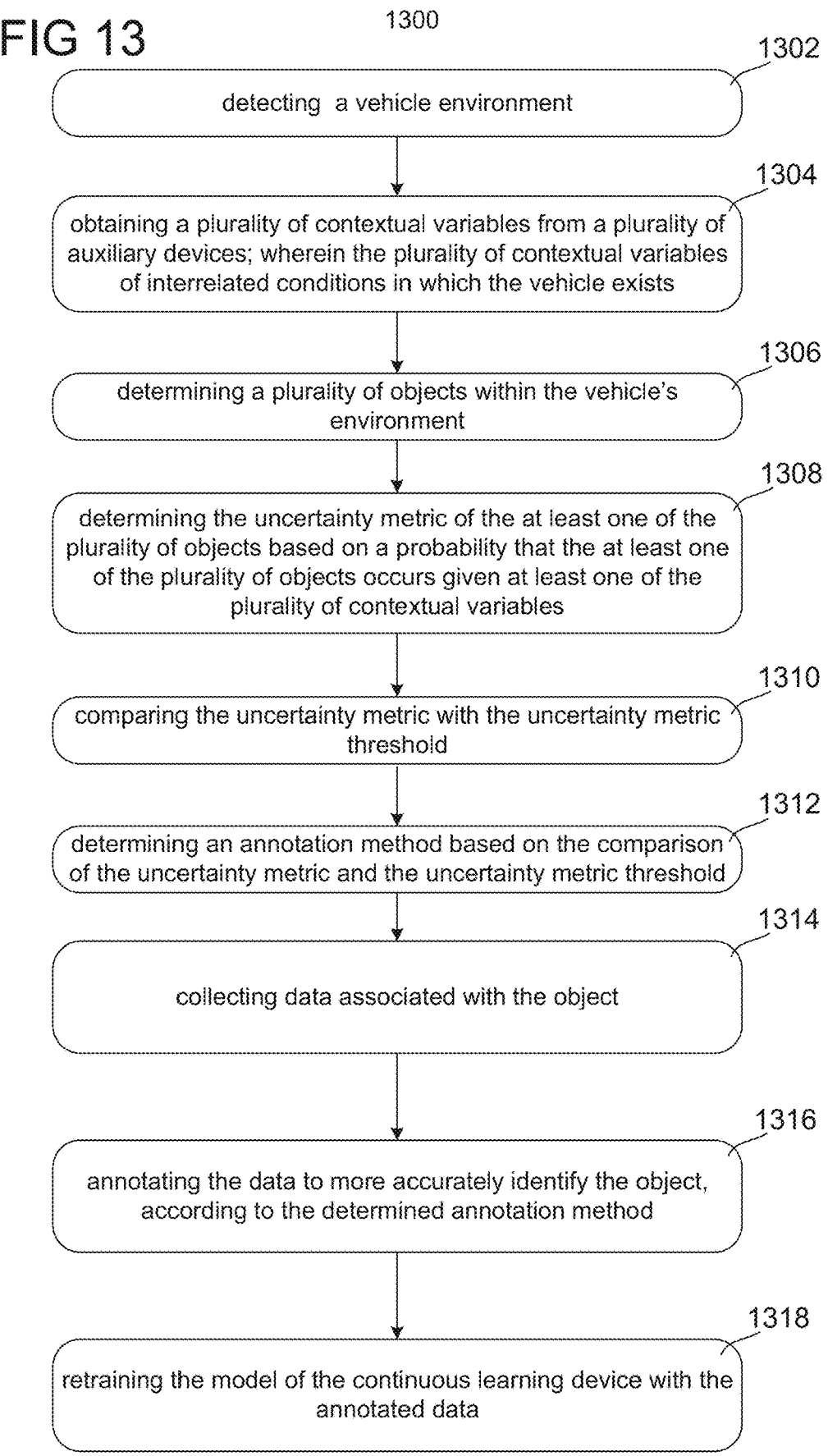

DEVICES AND METHODS FOR ACCURATELY IDENTIFYING OBJECTS IN A VEHICLE'S ENVIRONMENT

TECHNICAL FIELD

Various aspects of this disclosure generally relate to autonomous driving systems.

BACKGROUND

Autonomous driving utilizes reliable driving control and safety systems that process data acquired at a vehicle to implement a driving policy. Data may be acquired at the vehicle using one or more types of data acquisition devices and/or data may be received from an external source. Data may include data about the vehicle and/or the vehicle's environment among other things. The vehicle may be configured to implement a specific driving policy based on the data such as altering its movements and/or modifying its positioning with respect to other external elements. Additionally, the autonomous vehicles may be configured to communicate with other devices, such as other vehicles, network infrastructure elements, other wireless devices, etc., to assist in the vehicle's movement, provide faster information processing, and, generally speaking, communicate information with external elements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 7 shows an exemplary vehicle environment according to some aspects.

FIGS. 11-13 show an exemplary flowcharts according to some aspects.

DESCRIPTION

Figure 1:
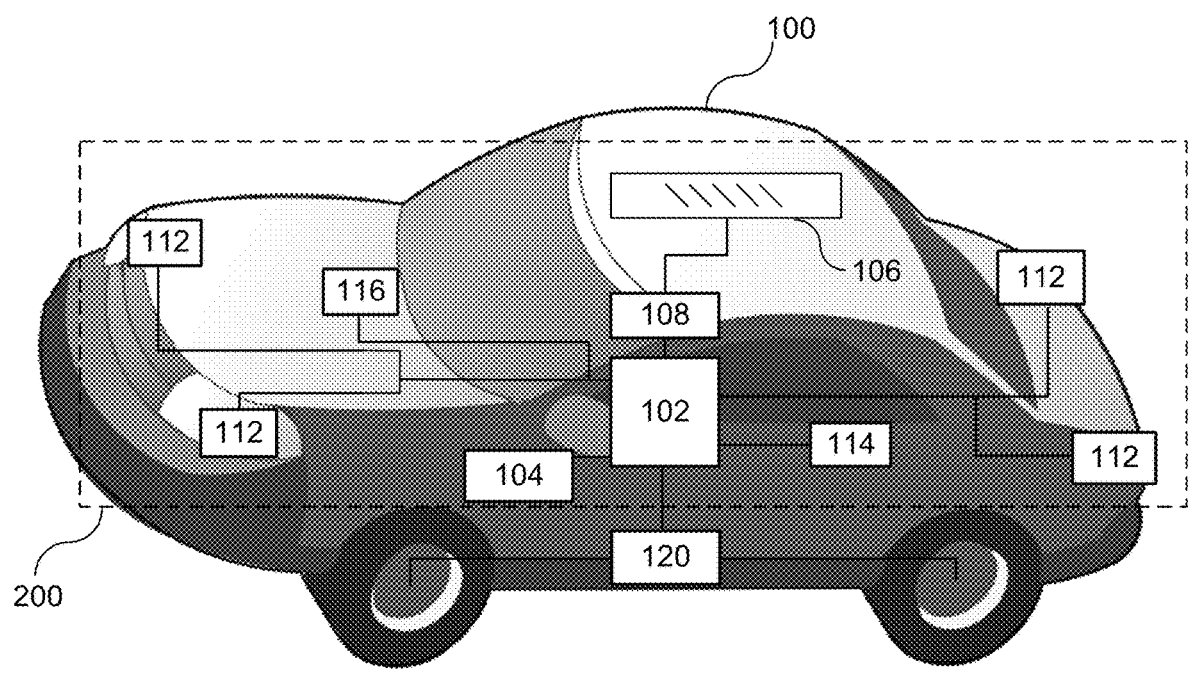
FIG. 1 shows an exemplary autonomous vehicle in accordance with various aspects of the present disclosure.

The following detailed description refers to the accompanying drawings that show, by way of illustration, exemplary details and aspects in which the disclosure may be practiced.

The word "exemplary" is used herein to mean "serving as an example, instance, or illustration". Any embodiment or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," or the like. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, or the like, and conversely that any single processor, controller, or logic circuit detailed herein may be realized as two (or more) separate entities with equivalent functionality, or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Accordingly, similar to a ground vehicle having wheels, belts, etc., for providing mobility on terrain, an "aerial vehicle" may have one or more propellers, wings, fans, or the like, for providing the ability to maneuver in the air. An "aquatic vehicle" may be understood to be any type of vehicle, as described above, which is capable of maneuvers on or below the surface of liquid, e.g., a boat on the surface of water or a submarine below the surface of water. It is appreciated that some vehicles may be configured to operate as one or more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of propulsion unit(s), types of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine-learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle according to the manners described in this disclosure.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects of this disclosure. It is appreciated that vehicle 100 and control system 200 are exemplary in nature and may thus be simplified for explanatory purposes. For example, while vehicle 100 is depicted as a ground vehicle, aspects of this disclosure may be analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation of vehicle 100 from one or more components of the control system 200. The autonomous driving components of mobility system 120 may also interface with one or more radio frequency (RF) transceivers 108 to facilitate communication with other nearby vehicular communication devices and/or central networking components, via antenna system 106, that perform decisions and computations related to autonomous driving.

Figure 2:
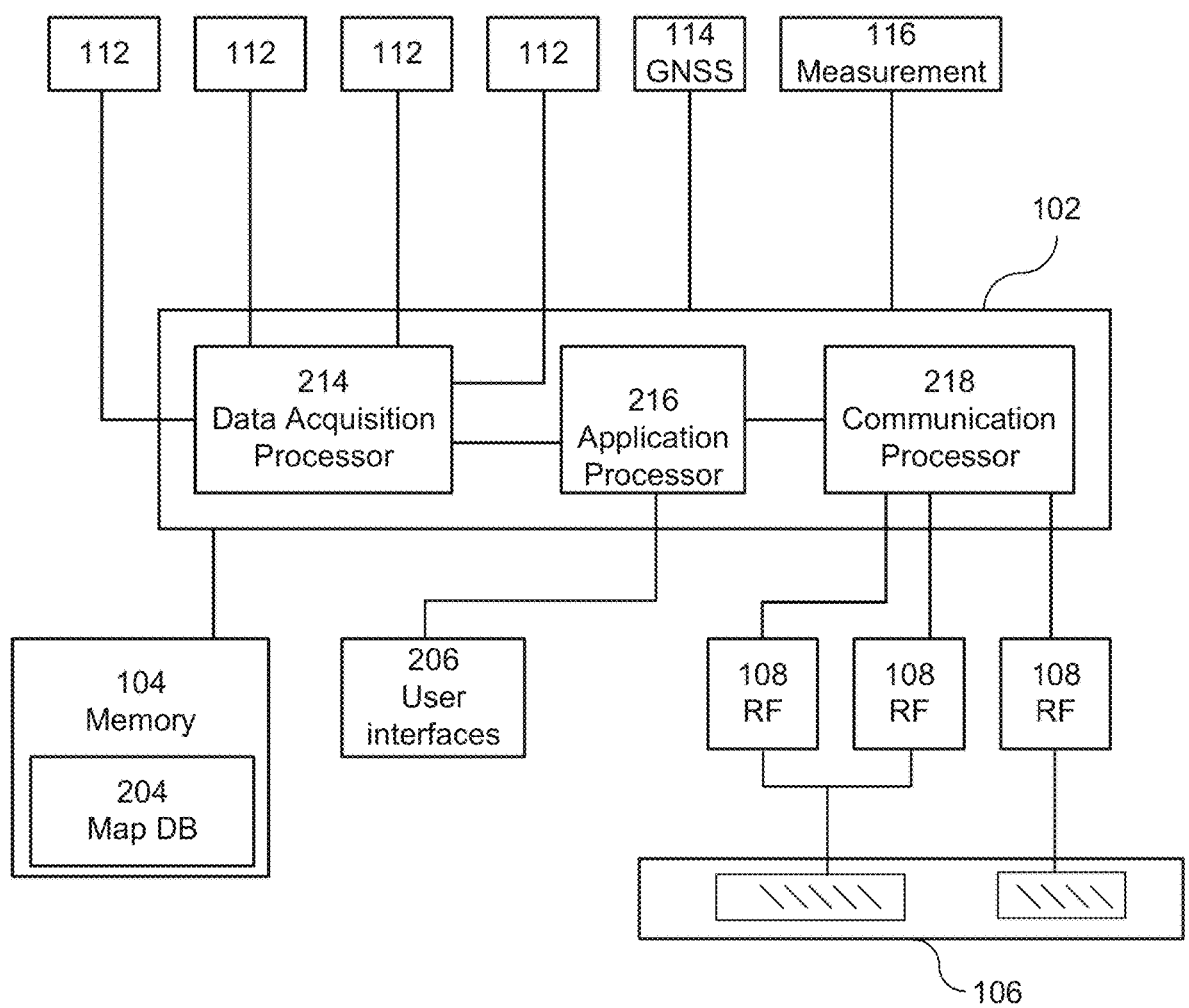
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position sensors 114 such as a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 216 may include processing circuitry, such as a CPU, for processing data acquired by data acquisition units 112. For example, if one or more data acquisition units are image acquisition units, e.g. one or more cameras, then the data acquisition processor may include image processors for processing image data using the image acquisition units as an input. The data acquisition processor 216 may be configured to create voxel maps detailing the surrounding of the vehicle 100 based on the data input from the data acquisition units 112.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver 108. RF transceiver 108 may then process the digital baseband samples to convert the digital baseband samples to analog RF signals, which RF transceiver 108 may wirelessly transmit via antenna system 106. In the receive path, RF transceiver 108 may receive analog RF signals from antenna system 106 and process the analog RF signals to obtain digital baseband samples. RF transceiver 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via user interface 206.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, GNSS device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP ($3^{rd}$ Generation Partnership Project) standards. As a further example, communication processor 218 may be configured to operate via a third RF transceiver of the one or more RF transceivers(s) 108 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed around on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antenna elements may be placed at the front, back, corner(s), and/or on the side(s) of the vehicle 100.

Data acquisition devices 112 may include any number of data acquisition devices and components depending on the requirements of a particular application. This may include, but is not limited to: image acquisition devices, proximity detectors, acoustic sensors, infrared sensors, piezoelectric sensors, etc., for providing data about the vehicle's environment. Image acquisition devices may include, but are not limited to: cameras (e.g., standard cameras, digital cameras, video cameras, single-lens reflex cameras, infrared cameras, stereo cameras, etc.), charge coupling devices (CCDs) or any type of image sensor. Proximity detectors may include, but are not limited to: radar sensors, light detection and ranging (LIDAR) sensors, mmWave radar sensors, etc. Acoustic sensors may include, but are not limited to: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc.

Position devices 114 may include components for determining a position of the vehicle 100, e.g. global position system (GPS) circuits, configured to communicate with a GPS satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 e.g. integrated with or separate from an engine control unit (ECU) of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are shown, and other interfaces between components may be covered within the scope of this disclosure.

Figure 3:
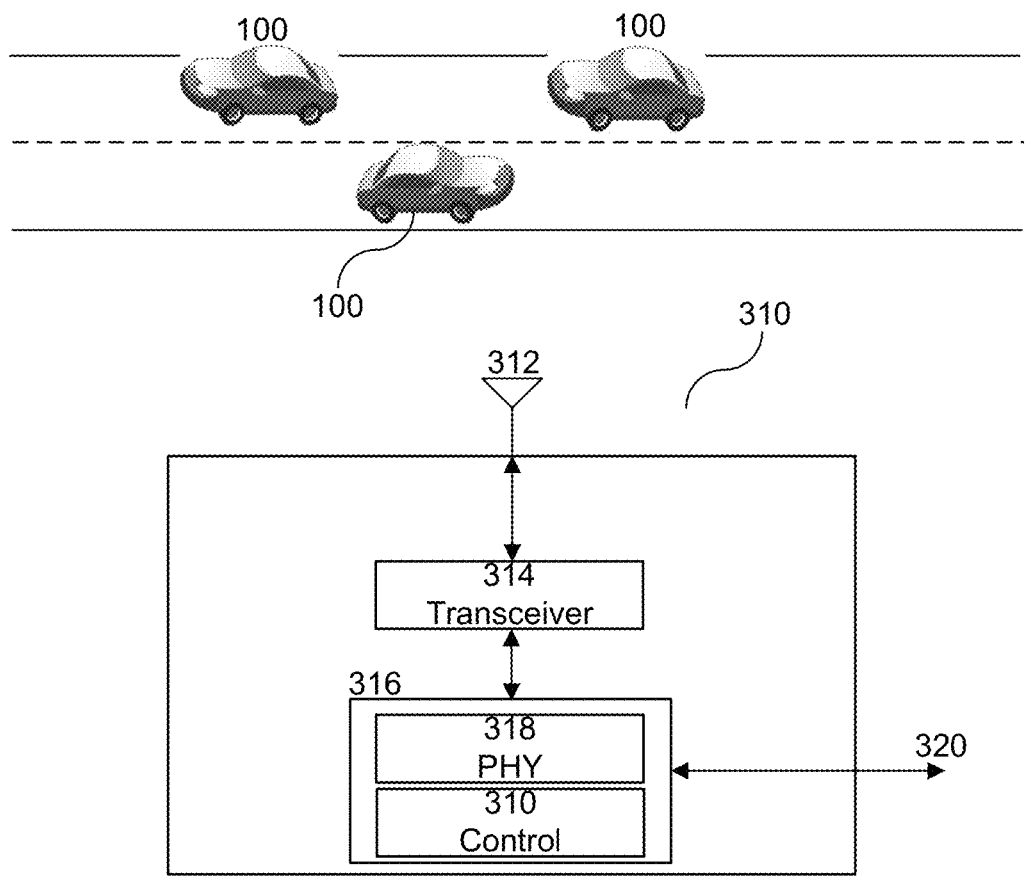
FIG. 3 shows an exemplary network area with various communication devices according to some aspects.

FIG. 3 shows an exemplary communication network 300 according to some aspects. Communication network 300 may include a plurality of vehicles 100, which may include, for example, drones and automobiles as shown in FIG. 3. Any one of these vehicles may communicate with one or more other vehicles 100 and/or with network infrastructure element (NIE) 310. NIE 310 may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 100 and the communications network.

NIE 310 may include, among other components, at least one of an antenna system 312, a RF transceiver 314, and a baseband circuit 316 with appropriate interfaces between each of them. In an abridged overview of the operation of NIE 310, NIE 310 may transmit and receive wireless signals via antenna system 312, which may be an antenna array including multiple antenna arrays. Antenna system 312 may include multiple antenna elements (e.g., multiple antenna arrays) in order to employ multiple-input and multiple-output (MIMO) methods and schemes.

RF transceiver 314 may perform transmit and receive RF processing to convert outgoing baseband samples from baseband circuit 316 into analog radio signals to provide to antenna system 312 for radio transmission and to convert incoming analog radio signals received from antenna system 312 into baseband samples to provide to baseband circuit 316. Accordingly, RF transceiver 314 may be configured to operate similarly to the RF transceiver(s) described in FIGS. 1 and 2, albeit on a much larger scale (e.g., amplifiers to transmit much higher power signals, etc.).

Baseband circuit 316 may include a controller 310 and a physical layer processor 318 which may be configured to perform transmit and receive PHY processing on baseband samples received from RF transceiver 314 to provide to a controller 310 and on baseband samples received from controller 310 to provide to RF transceiver 314. In some aspects, the baseband modem 316 may be located external to the NIE 310, e.g., at a centralized location of a mobile radio communication network. Controller 310 may control the communication functionality of NIE 310 according to the corresponding radio communication technology protocols, which may include exercising control over antenna system 312, RF transceiver 314, and physical layer processor 318. Each of RF transceiver 314, physical layer processor 318, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 310 may also include an interface 320 for communicating with (e.g. receiving instructions from, providing data to, etc.) with a core network according to some aspects.

Additionally, NIE 310 may include a memory 330, which may be internal to NIE 310 (as shown in FIG. 3) or external to NIE 310 (not shown). Memory 330 may store one or more maps of the coverage area of NIE 310 among other information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 330 may also store maps corresponding to one or more neighboring areas of NIE 310 so as to provide vehicles within its coverage area with information of neighboring coverage areas (e.g., to facilitate the handover process to the coverage of the neighboring NIE).

Autonomous vehicles may employ visual perception systems to detect its surrounding environment. As the vehicle's environment changes, the visual perception system should be able to learn from unexpected results, such as a detected object that the visual perception system cannot confidently identify. Identifying data associated with low confidence such as dataset shift scenes and out-of-distribution data is a challenging task. Allowing ADAS to evolve with real-world dynamics by continuously learning from the stream of data in the changing environment without catastrophic forgetting will lead to safer ADAS.

Visual perception tasks can include object detection, semantic segmentation, instance segmentation, image classification, and video classification among others.

Identifying a data shift scene (e.g. adverse weather conditions including fog/snow/frost) or out-of-distribution data (i.e. unseen object class during model training, new geological location) demonstrates the need for updating the visual perception system with a continuous learning framework model. Reliable uncertainty estimation in predictions is essential for designing safer and robust AI systems.

As artificial intelligence (AI) systems become pervasive in autonomous vehicles and control of the vehicles being handed over to the AI systems, safety concerns arise. Robustness of these systems is of paramount importance to prevent catastrophic consequences.

An ADAS may implement a continuous learning framework model which identifies data that the ADAS is uncertain of. To accomplish this task, the ADAS may utilize a probabilistic deep neural network such as a Bayesian Neural Network to capture reliable uncertainty estimates, which can identify a dataset shift and/or out-of-distribution data.

Implementing a more robust ADAS may include identifying observed data for which the probabilistic deep neural network (DNN) model of the ADAS is uncertain. Once identifying data for which the probabilistic DNN is uncertain, the ADAS can employ a continuous learning framework to identify dataset shift and out-of-distribution data and retrain the probabilistic DNN with correctly identified or labeled data.

A continuous learning framework may enable safer and robust visual perception systems by identifying unreliable predictions. Once unreliable predictions have been identified, the data associated with the prediction may be annotated for more accurate predictions in the future.

Efficiently annotating data newly observed data (including data shift and out-of-distribution) may be used to retrain the probabilistic model. Data annotation is a crucial, tedious, and expensive task. Streamlining this process will enable uncertainty-aware active learning, which in-turn will improve the probabilistic model robustness for safer autonomous vehicles.

Newly observed data may yield predictions associated with high uncertainty. The newly observed data may be used within an active learning framework to update the probabilistic model. In this way, the probabilistic model maintains probability distribution of weights and features. Therefore the uncertainty-aware continuous learning framework will not be prone to catastrophic forgetting.

Newly observed data identified as uncertain may be efficiently annotated and used to retrain the probabilistic deep neural network. By identifying the data for which the predictions are associated with high input uncertainty (aleatoric) and/or high model uncertainty (epistemic), the ADAS can utilize manual annotation. For the predictions associated with low uncertainty, ADAS can annotate the data automatically from the predictions.

Manually annotating data by a human expert is very tedious and expensive. Choosing to only manually annotate data associated with high aleatoric uncertainty and/or epistemic uncertainty reduces the cost associated with manually annotating all data.

Automatically annotating data with incorrect labels may lead to the probabilistic model to become overconfident toward incorrect predictions. This could result in high confidence on incorrect predictions, and a failure under dataset shift scenarios and/or out-of-distribution data.

An overconfident DNN may lead to performance degradation, resulting in catastrophic situations for autonomous vehicles. Choosing to only automatically annotate data associated with low uncertainty predictions reduces the risk that the probabilistic model may become overconfident.

By using a combination of manual and automatic data annotation, the ADAS can efficiently annotate data by minimizing the expense of manual annotation and minimizing the risk of an overconfident probabilistic neural network.

To identify which data will be automatically annotated and which will be manually annotated, the continuous learning framework uses on an uncertainty metric generated by a probabilistic model. For example, an uncertainty metric may be a probability that a prediction for a perceived or detected object is correct or accurate. The uncertainty metric is associated with a perceived or detected object and used to determine if the data associated with the object will need to be annotated manually by an expert.

Conventionally, DNNs do not provide an uncertainty estimate when making predictions. However, generating and capturing uncertainty estimates from a DNN can prevent the DNN from becoming overconfident. Data associated with objects that were not observed during the training may lead to an incorrect object prediction.

To determine whether a prediction is associated with high or low risk uncertainty, a certainty, an uncertainty threshold must be defined. The measure of accuracy versus uncertainty of predictions from previously trained probabilistic DNNs are used to determine the threshold. The measurements may be predictions that are: accurate & certain ($n_{ac}$), accurate & uncertain ($n_{au}$), inaccurate & certain ($n_{ic}$), and inaccurate and uncertain ($n_{iu}$) may be used to determine an uncertainty threshold for future predictions. As an example, the equation below may be used to calculate a threshold.

$$AvU = \frac{n_{ac} + n_{iu}}{n_{ac} + n_{au} + n_{ic} + n_{iu}}$$

The model may include an optimal uncertainty threshold based on an uncertainty value that maximizes Accuracy versus Uncertainty (AvU) value as identified by the formula above to determine which data is to be annotated and used to retrain the model.

These measurements identify what the model already "knows" and will be retained after retraining, as the prior distribution of the model parameters of the probabilistic DNN, for example a Bayesian DNN, is initialized with the posterior distribution of model parameters from the previously trained model. The predictions are marginalized over the probability distribution of model parameters rather than point estimate. Identifying the accurate predictions made by the previously trained probabilistic model allows the model to retain the accurate predictions when retraining occurs. Therefore, the probabilistic model does not "forget" what it has already learned.

Data associated with objects that are uncertain may be annotated and used to retrain the probabilistic model so that it may "learn" about objects that had not been observed during previous trainings of the DNN.

An uncertainty metric associated with observed data which is higher than the uncertainty threshold will trigger the data to be annotated manually by an expert. Comparisons between the uncertainty metric and the optimal uncertainty threshold are used to determine the level of uncertainty. An uncertainty metric higher than the uncertainty threshold may be associated with observed data having high levels of uncertainty and annotated manually. An uncertainty metric that is less than or equal to the uncertainty threshold may be associated with observed data having low levels of uncertainty and annotated automatically.

Uncertainty metrics may help identify a dataset shift scenario and/or out of distribution data.

Data with high levels of uncertainty and low levels of uncertainty may be transmitted from an autonomous vehicle to a network infrastructure. The transmission may include information identifying the annotation method. Data with high levels of uncertainty will be flagged for manual annotation and data with low levels of uncertainty will be flagged for automatic annotation.

Data annotation includes labeling of the data associated with an observed object to make the data usable for machine learning, such as a DNN. The data may include an image of an observed object. After annotation, the image may be used to train a DNN.

Annotation of the data and retraining of the model using the newly annotated data may occur in the network infrastructure. The newly trained model may be redeployed to the vehicle from the network infrastructure to the vehicle.

Figure 4:
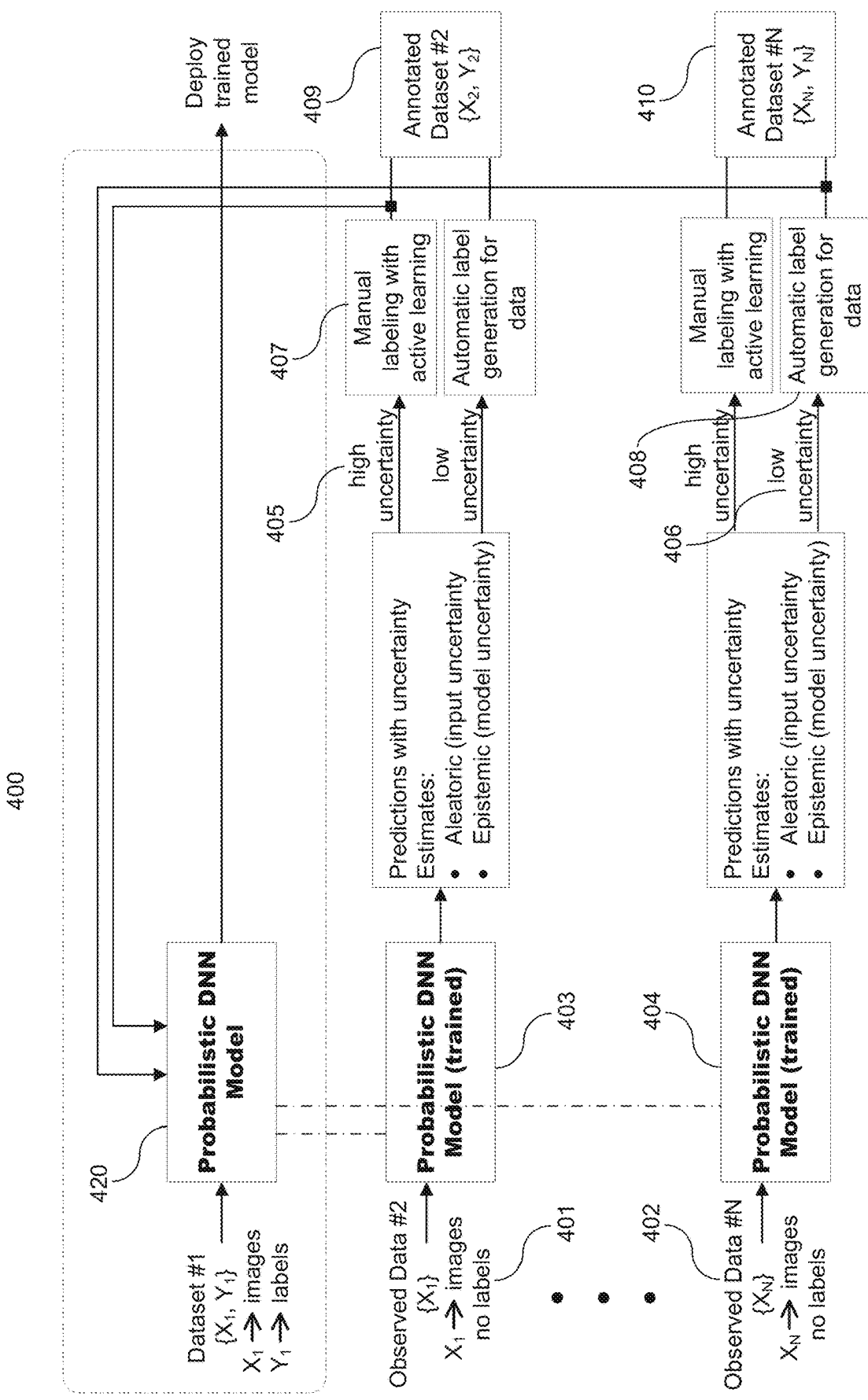
FIG. 4 shows an exemplary efficient data annotation and probabilistic model retraining according to some aspects.

FIG. 4 shows an exemplary flowchart 400 describing a method for retraining a probabilistic model with observed data associated with uncertainty when predicted using a previously trained probabilistic model. It is appreciated that flowchart 400 may be simplified for purposes of this explanation.

The method of flowchart 400 may include collecting data about the vehicle's environment. Observed data 401 and 402 may be images of objects within the vicinity of the vehicle. Observed data 401 and 402 may be associated with objects that were not observed during a previous training of the probabilistic model. As such, the model may not be able to identify the object with a high level of certainty. Probabilistic DNN model 403 is used to predict an object associated with data 401. Probabilistic DNN model 403 generates a prediction for observed data 401 and an uncertainty metric associated with that prediction. Additionally, Probabilistic DNN model 403 may include a certainty threshold. A comparison of the uncertainty metric and the certainty threshold may result in a prediction of high uncertainty 405 for observed data 401. Data associated with high uncertainty may be flagged for manual annotation 407. Newly annotated data 409 may be used to retrain Probabilistic DNN model 420. Similarly, probabilistic DNN model 404 is used to predict an object associated with data 402. Probabilistic DNN model 404 generates a prediction for observed data 402 and an uncertainty metric associated with that prediction. Additionally, Probabilistic DNN model 404 may include a certainty threshold. A comparison of the uncertainty metric and the certainty threshold may result in a prediction of low uncertainty 406 for observed data 402. Data associated with low uncertainty may be flagged for automatic annotation 408. Newly annotated data 410 may be used to retrain Probabilistic DNN model 420.

The tasks of annotating data and retraining probabilistic DNN model 420 may occur in a network structure separate from the vehicle.

Probabilistic DNN models 403 and 404 may be the same probabilistic DNN model and make predictions for observed data 401 and 402 simultaneously. Once probabilistic DNN model 420 is retrained using annotated data 409 and/or 410 it may be deployed and replace probabilistic DNN models 403 and 404 for use in predicting future observed data.

It may be useful to only retrain model 420 with manually annotated data 409 if data associated with low uncertainty is of no concern. Using only manually annotated data 409 minimizes the expensive task of retraining model 420. Additionally, newly annotated data may be collected and retraining model 420 may occur when using both annotated data 409 and 410 simultaneously.

Probabilistic models may take into account several inputs to generate predictions that include an uncertainty metric. The uncertainty metric may be an estimate of the probability that the prediction is accurate.

A probabilistic model may use images of a vehicle environment in conjunction with contextual variables in which the images exist. Contextual variables may be obtained from auxiliary devices. For example, an image may include contextual data such as the time of day, geographic location, weather, etc. Contextual data can aid the in the perception of a vehicle's environment. For example, pedestrians may be more likely to occur on sidewalks or in crosswalks.

Additionally, using a probabilistic model to generate a probability value associated with a prediction can serve as a reliable measure of confidence.

Contextual variables along with images of the vehicle's environment are used to train a probabilistic model that can generate an uncertainty metric when predicting objects in the vehicle's vicinity.

Building and training the probabilistic deep neural network includes using a joint distribution of contextual variables and annotated images of a vehicle environment as inputs.

Probabilistic models may be trained using existing techniques for each user over an initial training period by accumulating a corpus of scene and contextual data. As a further innovation, we propose to personalize this model to each user of an AV. The motivation behind this is the observation that people are creatures of habit and typically follow predictable, repetitive routines. Personalizing the model for each user therefore makes it more relevant and reliable.

For example, a probabilistic deep neural network may be trained for individual users of an autonomous vehicle. In this way, driving habits of individuals may be taken into account when training the probabilistic model. For example, driver A may drive in scenarios where pedestrians occur more frequently than driver B. Therefore, the confidence estimates may be more precise when being trained for individual drivers.

If contextual variables are found to vary significantly from the contextual variables used during training, such variation may indicate the following:

An anomalous situation which may be used trigger the autonomous vehicle to shift into a more cautious/conservative mode of operation.

A trigger to update the probabilistic model with the new contextual information encountered.

Inference on these models involves evaluating queries (conditional queries, MAP queries, marginal evaluations) over the models variables. An as example, suppose there are N perception/scene variables $s_1, \ldots, s_N$, M contextual variables $C_1, \ldots, C_M$, and K outcome variables $o_1, \ldots, o_K$ (such as object IDs, semantic labels, etc.). Further suppose, only two scene variables $s_1$ and $s_2$ are observed along with all the contextual variables. It is desired to determine the most likely outcome of $o_1$. This can be formulated as a conditional probability query: evaluate $p(o_1|s_1, s_2, c_1, \ldots, c_m)$. Using Bayes rule and simple algebra, it is possible to evaluate this to:

$$\frac{\sum_{k \neq 1} \sum_{n \neq 1,2} p(o_1, \ldots, o_K, s_1, \ldots, s_N, c_1, \ldots c_M)}{\sum_{k} \sum_{n \neq 1,2} p(o_1, \ldots, o_K, s_1, \ldots, s_N, c_1, \ldots c_M)}$$

Various efficient methods of probabilistic inference exist to perform the computations shown above. These include exact methods (belief propagation, variable elimination) which involve simplifying the joint distribution as a product of simpler factors, or approximate methods (variational methods, sampling-based methods). Note that an additional benefit of performing probabilistic inference as describe above is that the output is now associated with a principled probability value which can serve as a reliable measure of confidence, as opposed to the softmax-based confidence of deep-networks which is known to be overconfident and unreliable in challenging conditions.

A perception system used to detect a vehicle's environment may be used in conjunction with a probabilistic model to generate prediction with a probability estimate. An algorithm may take in as input contextual variables and outputs of vehicle perceptions system. The algorithm may use the probabilistic DNN model to estimate a probability of the perception outputs given the perceived environment and the contextual variables.

To make this inference, the algorithm may use conditional queries, MAP queries, marginal evaluations, etc. Perception systems in autonomous vehicles which leverage contextual information may improve performance and reliability.

The inference process described here requires computations in addition to those performed by the perception system. These computations need to be computed with low latency in order to maintain the safe operation of the vehicle. This may result in the need for additional specialized hardware in order to be able to meet the real-time requirements. Use of exact inference techniques (such as belief propagation) might require the design of specialized processing units. Use of approximate techniques (sampling-based) would require the ability to rapidly generate high-quality pseudo-random numbers and the ability to process multiple samples in parallel to generate the final probabilistic outcome.

Figure 5A:
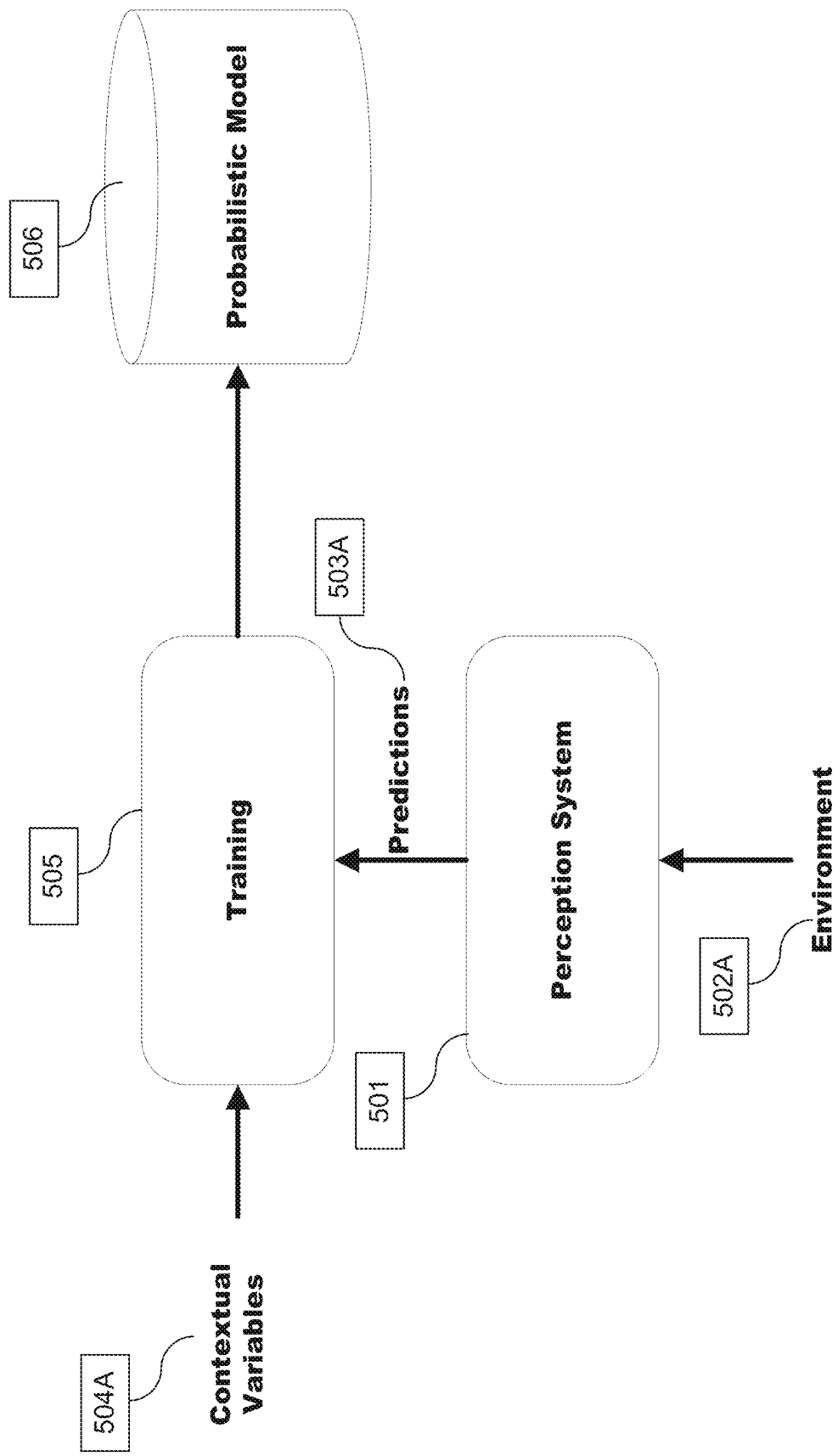
FIGS. 5A-B shows an exemplary probabilistic model according to some aspects.

The methods and devices may also implement training schemes for training probabilistic DNN model. FIG. 5A shows an exemplary representation 500A of how a probabilistic model may be trained. Detection system 501 may detect or perceive an vehicle environment 502A. Detection system 501 may employ data acquisitions devices such 112 to perceive vehicle environment 502A. Detection system 501 may use a trained deep neural network to predict objects in the perceived vehicle environment 502A. Data associated with perceived vehicle environment 502A may be annotated to correctly identify the objects in the environment. A joint probability distribution may be used to train 505 the probabilistic model 506. The joint probability distribution is built with both contextual variables 504A and the predictions 503A.

Figure 5B:
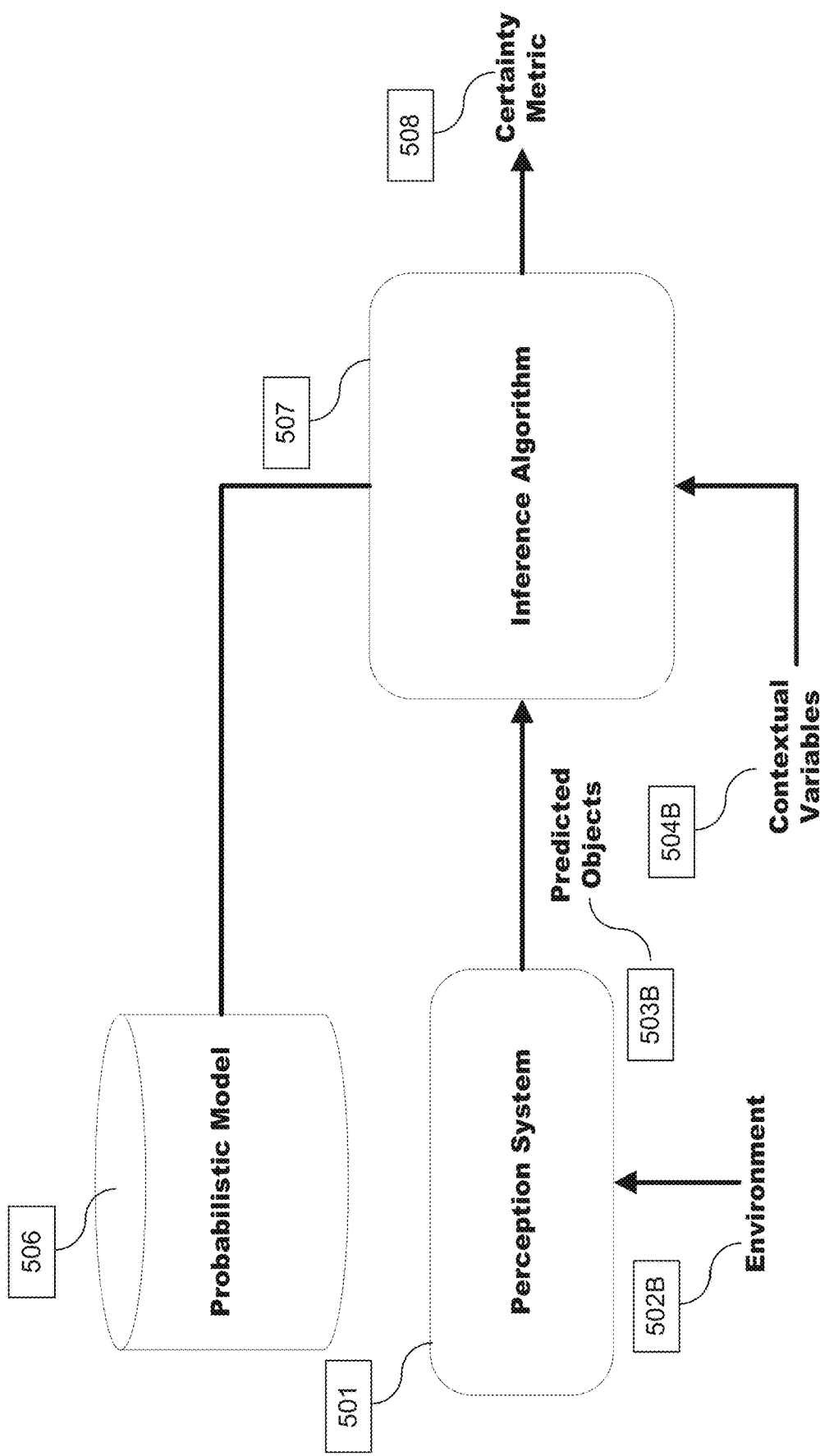

The methods and devices may also implement certainty metric generation schemes for use in an autonomous vehicle. FIG. 5B shows an exemplary representation 500B of how a probabilistic model may be used to generate an uncertainty metric. Detection system 501 may detect or perceive a vehicle environment 502B. Detection system 501 may employ data acquisitions devices such 112 to perceive vehicle environment 502B. Detection system 501 may use a trained deep neural network to predict objects 503B in the perceived vehicle environment 502B. Inference algorithm 507 may take in as input the predicted objects 503B and contextual variables 504B. Algorithm 507 uses inputs 503B and 504B to query the probabilistic model 506 to determine the probability of a predicted object given the vehicle environment 502B and contextual variables 504B. Algorithm 507 generates an uncertainty metric 508 associated with a predicted object based on the probability it exists given the perceived vehicle environment 502B and contextual variables 504B. Certainty metric 508 is a measure of how confident the prediction is. If the confidence is low an autonomous vehicle may not want to rely on the prediction. Said differently, if the prediction has a level of uncertainty that does not fulfill a threshold, it may be safer for an autonomous vehicle to ignore the prediction.

Probabilistic model 506 may be configured in many several ways. In addition to the scheme shown in FIG. 5A, probabilistic model 506 may also take in as input feature embeddings from perception system 501, such as a deep neural network, for training the probabilistic model 506.

Probabilistic model 506 defines a joint distribution of contextual variables and prediction variables. Different structures may be used to represent a joint distribution of the variables.

A probabilistic model that may take both contextual variables as well as perception variables as input. Perceived variables may be predicted outcomes from a deep neural network. Contextual variables include information such as a person ID, ego-location of the vehicle (from GPS and maps), date and time, weather conditions, etc. The person ID may be useful since multiple users can use the same vehicle and have different driving behaviours. The perception variables can include the labels, location, and bounding-box of detected entities, for example. A bounding-box of a detected or perceived entity may be in terms of pixels.

Efficient structures for representation of a probabilistic model defining a joint distribution include probabilistic graphical models. For example, Bayesian networks or Markov networks.

Figures 6A, 6B:
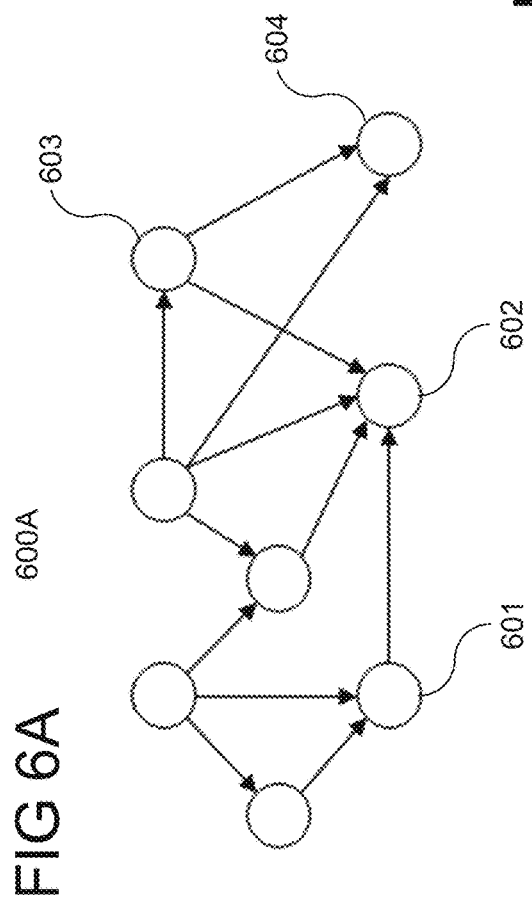
FIGS. 6A-B show exemplary joint probability distribution structures according to some aspects.

FIGS. 6A and 6B show exemplary structures of a probabilistic model. FIG. 6A shows Bayesian network 600A which includes nodes 601-604 among others. Nodes 601 and 602 may be contextual variables such as the time of day and that it is raining respectively. Nodes 603 and 604 may be perceived variables such as a pedestrian or a vehicle respectively. Using the network 600A, inference algorithm 507 may use inputs of time 601, raining 602, and vehicle 604 to determine the probability that there is a pedestrian 603. Algorithm 507, may use that probability to generate an uncertainty metric for a predicted object 503B. Alternatively, probabilistic model 506 may be configured using a Markov network.

FIG. 6B shows a lookup table 600B for probabilities of predicted objects. Column 611 includes possible predicted objects. Column 612 includes whether or not objects have been detected in the vehicle environment. Columns 613 and 614 include contextual variables. Column 615 includes the probability of the predicted object in column 611, given the variables in columns 612-614.

Probabilistic model 506 may use any structure which can define a joint distribution over contextual and perceived variables.

FIG. 7 shows an exemplary perceived environment 700. Environment 700 may be similar to 502A and 502B. Detection system 501 may have accurately detected pedestrians 701A, 701B, and 701D. Combining the contextual information with the outcomes of the deep-network using a probabilistic scheme may enhance both performance and reliability of predictions. Detection system 501 may have also accurately detected sidewalk 702, road 703 and crosswalk 704. However, pedestrian 701C was not detected, for example because of BLUR. Although, 701C might not be identified as a pedestrian by detection system 501, inference algorithm 507 may calculate an uncertainty metric 508 based on the probability that 701C is a pedestrian given other perceived variables 701A, 701B, 701D, 702, 703, and 704 along with contextual variables. The certainty metric associated with 701C may be compared to an uncertainty metric threshold to determine how confident they are that it is a pedestrian and label it as a pedestrian.

Pedestrians are more likely to be detected on sidewalks, while vehicles are most likely to be detected on the road. Expressed in terms of probabilities, a distribution of pedestrian locations would be more concentrated at the sidewalks while distribution of vehicles would be almost fully concentrated on the road. However, the distribution of pedestrians would increase at the crosswalk even though it is in the middle of the road. Furthermore, if this were a crosswalk near a school, the distribution would peak at school start and end times and would be less at off-school hours. By incorporating contextual information, such as proximity to school, school hours, and crosswalk, it is possible to infer that the entity 701C is likely to be a pedestrian. Contextual information effectively defines a prior distribution on the target variables, for example pedestrians, in terms of the contextual variables.

Choosing an uncertainty metric threshold should identify a prediction as high or low uncertainty. One example is to calculate an accuracy versus certainty metric to compute the uncertainty threshold. This uncertainty threshold is used to decide between automated or manual data labelling. Using a previously trained model the accuracy and certainty numbers can be counted, as described below in FIG. 8.

Uncertainty estimation can assist in designing safer, reliable, and robust ADAS. Capturing reliable uncertainty estimates may be used to increase trust in the model for decision making. Capturing uncertainty estimates from DNN output can help avoiding overconfident decisions in scenarios when previously unseen data is observed in the vehicle's vicinity, such as images that were not observed by the model during training.

An exemplary method uses a previously trained probabilistic model to calculate a threshold. Given training dataset D={x,y} with inputs x={x1, ..., xN} and its corresponding outputs y={y1, ..., yN}. For parametric Bayesian settings the distribution over weights 'ω' of a function y=fω(x) that represent the structure of the neural network to generated outputs are inferred. A prior distribution is assigned over the space of model parameters p(ω) that captures parameters which generated outputs before observing data. A probability distribution over the outputs given the inputs p(y|x,ω) have to be defined as model likelihood. This is usually used as a categorical distribution over neural network output in classification settings and Gaussian distribution over neural network output in regression settings. Given the evidence data, prior distribution, and model likelihood, the posterior distribution over the space of parameters: p(ω|D) with Bayesian inference as shown in equation below. This distribution captures how likely the model parameters are, given the observed data.

$$p(\omega|D) = \frac{p(y|x, \omega)p(\omega)}{\int p(y|x, \omega)p(\omega)d\omega}$$

Where: p(ω) is the weight prior
p(y|x, ω) is the model likelihood
p(ω|D) is the weight posterior With the approximate the posterior for the model parameters inferred during Bayesian neural network training to predict an output for new data point by propagating over the model likelihood while drawing samples from the learned parameter posterior. Equation below shows predictive distribution of output y* given new input x*.

$$p(y^*|x^*), D = \int p(y^*|x^*, \omega)p(\omega|D)d\omega \approx \frac{1}{T}\sum_{i=1}^{T} p(y^*|x^*, \omega i); \omega i \sim p(\omega|D)$$

Figure 8A:
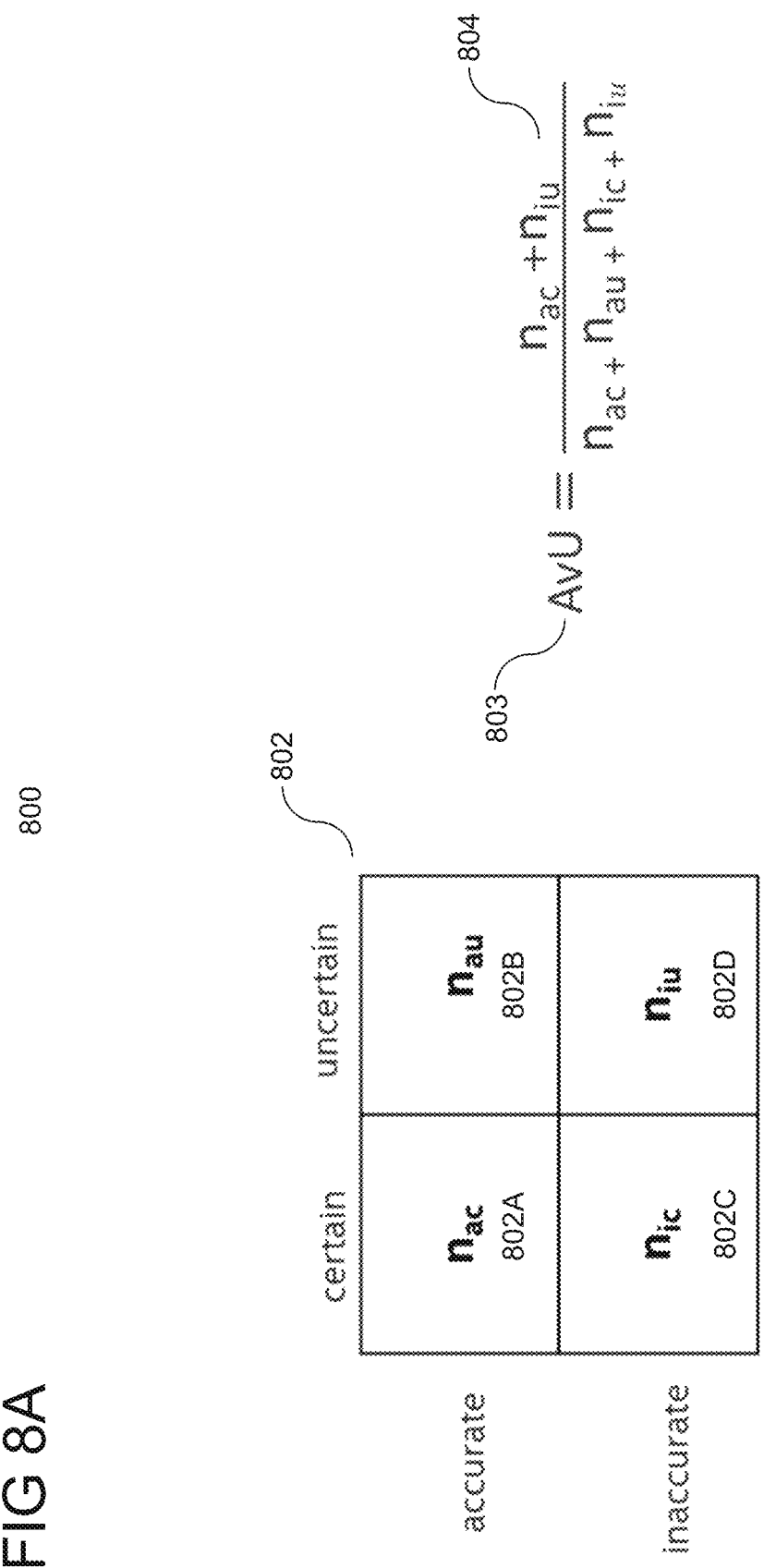
FIGS. 8A-B show an exemplary approach to calculating a certainty threshold according to some aspects.

FIG. 8A shows calculations 800 for determining an uncertainty metric threshold. Table 802 categorizes the predictions made using a previously trained probabilistic model. Predictions are categorized as accurate & certain ($n_{ac}$) 802A, accurate & uncertain ($n_{au}$) 802B, inaccurate & certain ($n_{ic}$) 802C, and inaccurate and uncertain ($n_{iu}$) 802D. Certainty metric 803 is calculated as the sum of $n_{ac}$ 802A and $n_{iu}$ 802D divided by the sum of $n_{ac}$ 802A, $n_{au}$ 802B, $n_{ic}$ 802C, and $n_{iu}$ 802D, as seen in equation 804. Certainty metric threshold 803 may be used to determine whether predictions using a probabilistic model are safe to use.

Figure 8B:
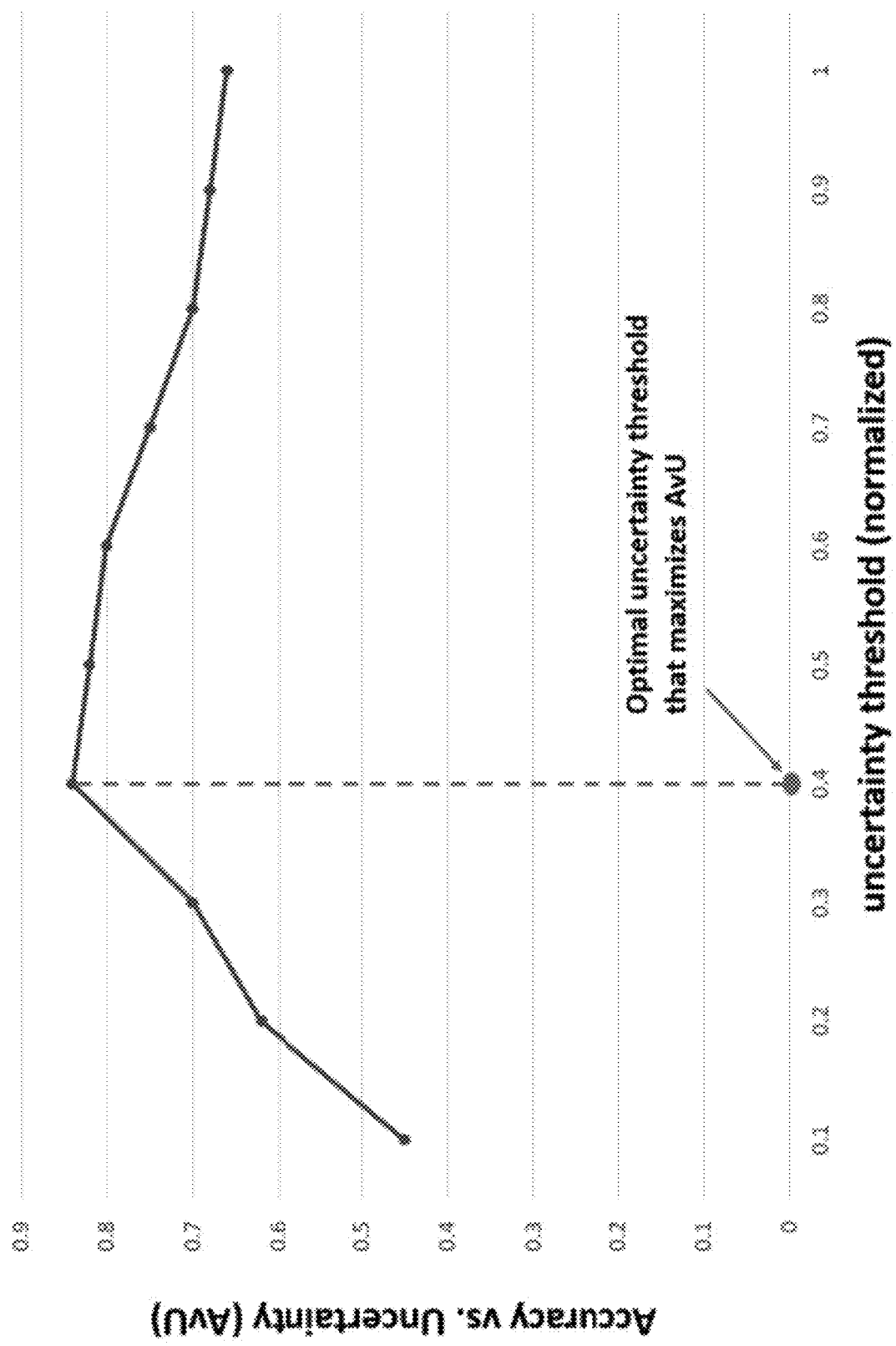

FIG. 8B shows one method 810 for calculating the threshold based on the value that maximizes the Accuracy versus Uncertainty (AvU) metric on the previously trained data. For example, An uncertainty metric threshold may be based on the value that maximizes the Accuracy versus Uncertainty (AvU) metric on the previously trained data.

Employing a probabilistic model may be useful when dealing with a data shift scenario, such as weather conditions which were not used during training of perception system 501 or out of distribution scenarios, such as objects that were not used during training of perception system 501.

Figure 9:
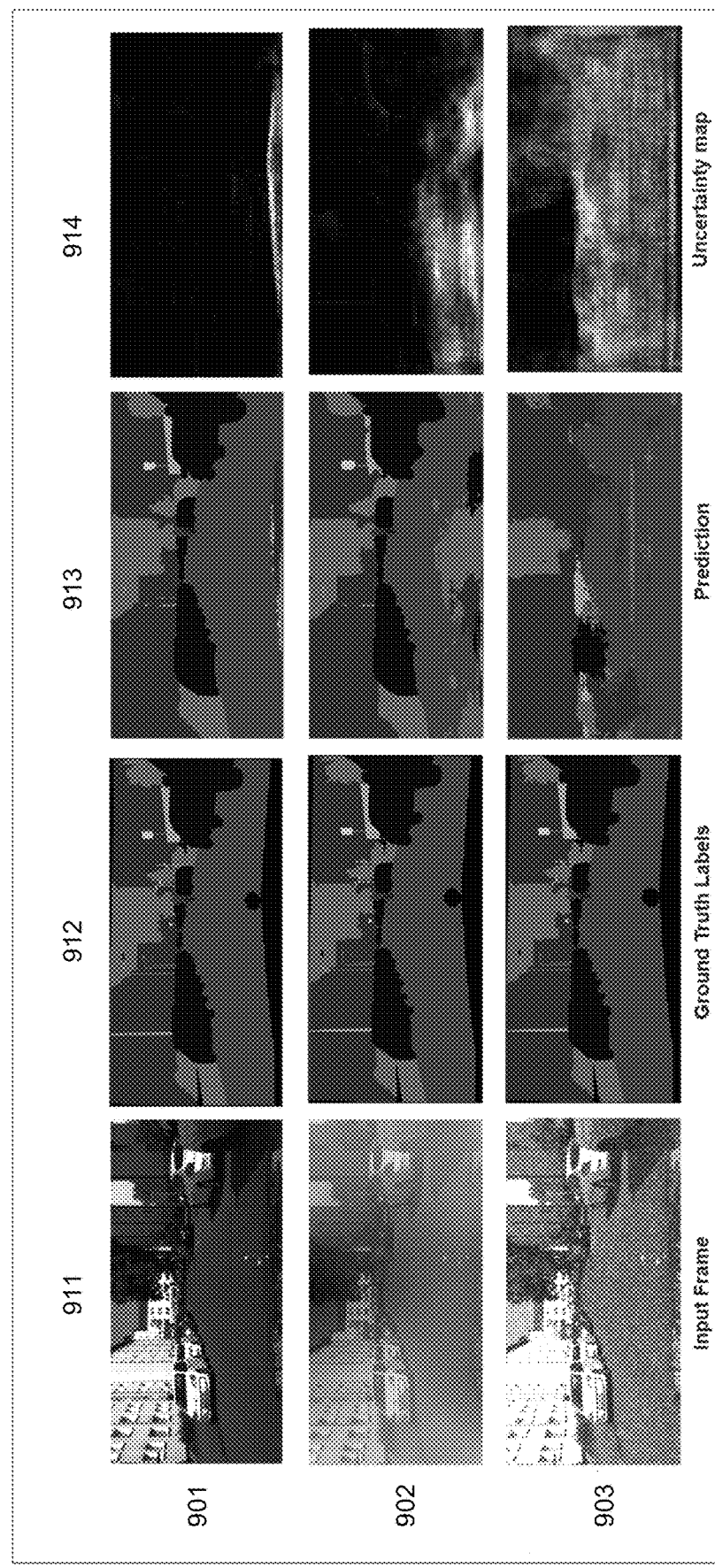
FIG. 9 shows an exemplary data shift scenario according to some aspects.

FIG. 9 shows an exemplary data shift scenario 900. For example, if perception system 501 was trained in sunny conditions, it may be better at detecting objects in sunny conditions versus foggy or snowy conditions. Row 901 represents a vehicle environment under sunny conditions. Row 902 represents the same vehicle environment under foggy conditions. Row 903 represents the same the vehicle environment under snowy conditions. Column 911 represents an image captured by an acquisition device 112. Column 912 represents the labeled images from column 911. Column 913 represents the object predictions based on the labeled images of column 912. Column 914 represents the uncertainty map of the predictions of column 913. The uncertainty map in column 914 displays a dark pixel if the prediction is certain and a light pixel if the prediction is uncertain. When comparing the uncertainty map of row 901 with that of rows 902 and 903, the uncertainty map of row 901 is much darker than that of row 902 and 903 and therefore more certain.

Figure 10:
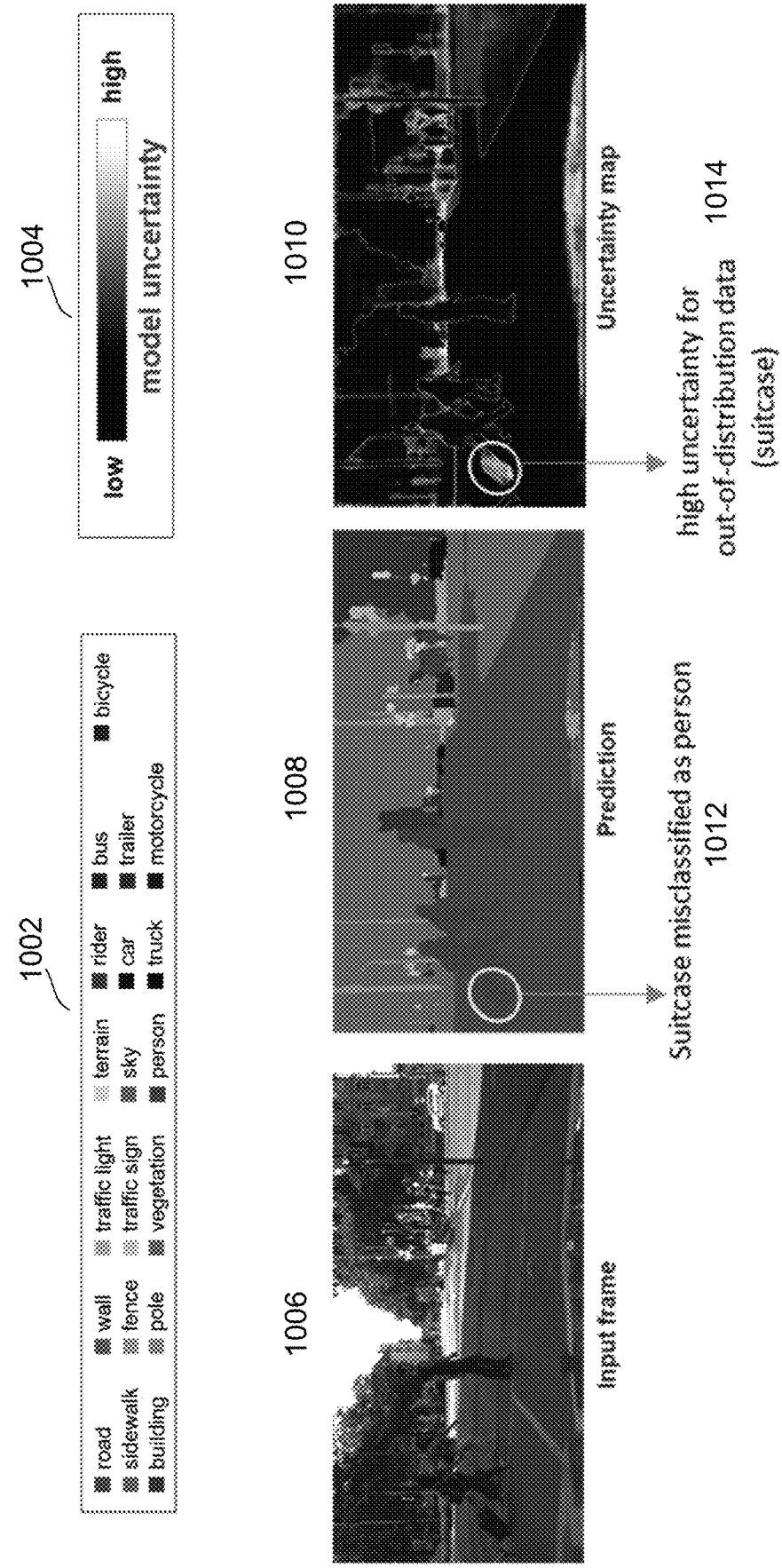
FIG. 10 shows an exemplary out of distribution scenario according to some aspects.

FIG. 10 shows an exemplary out of distribution scenario 1000. For example, there is an object in the image that was never observed during training and therefore is incorrectly predicted by the perception system. Image 1006 represents an image of a vehicle environment. Image 1008 represents a prediction of detected objects in image 1006 based on labels 1002. Because a suitcase was not included in the images used to train the perception system, there is no label for suitcase, and its prediction is incorrect 1012. Uncertainty indicator 1004 shows that dark pixels are associated with high certainty and light pixels are associated with high uncertainty. As shown in image 1010, the pixels associated with the suitcase in image 1006 are very light and therefore the prediction of the suitcase as a person is highly uncertain 1014.

Figure 11:
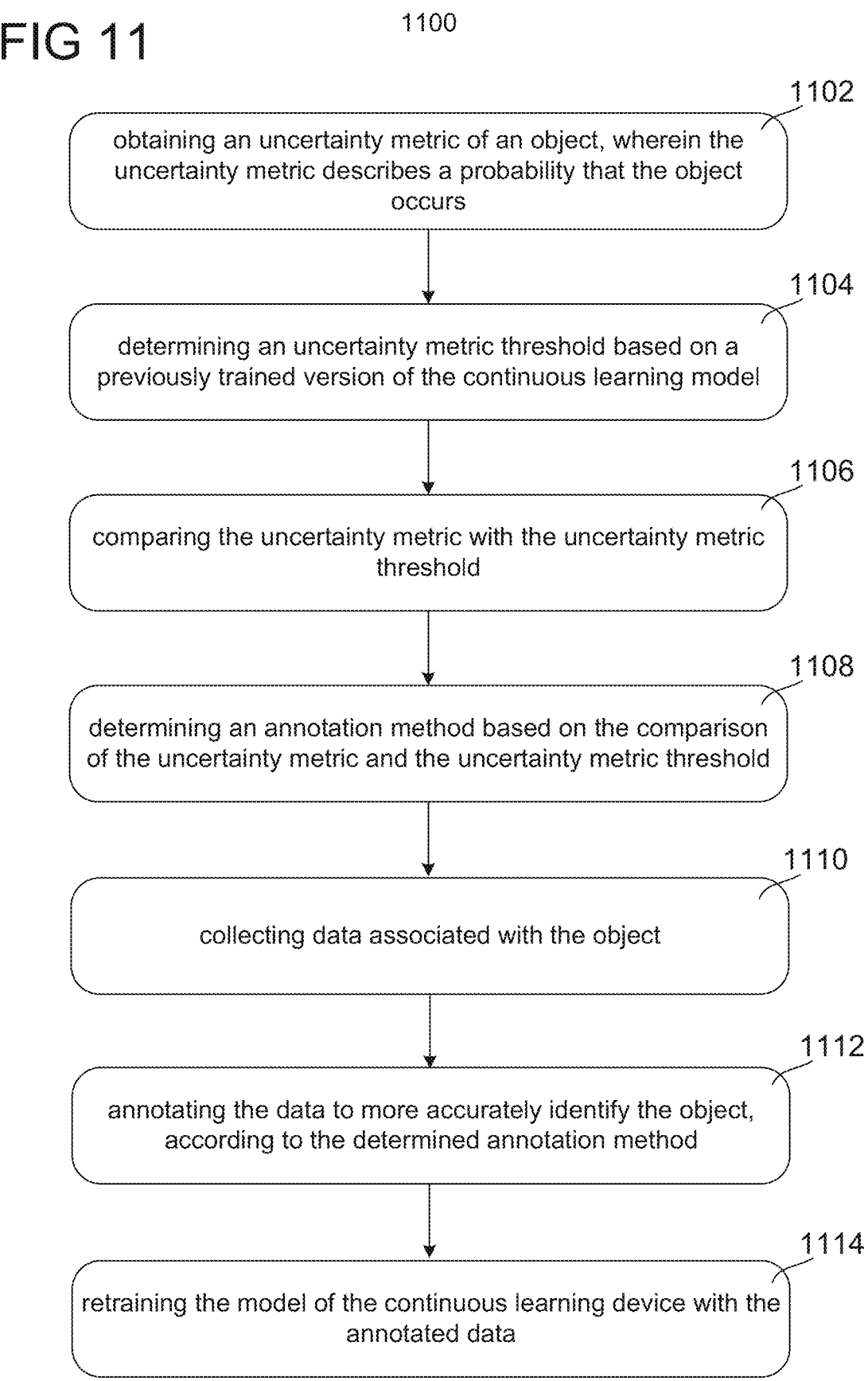

FIG. 11 shows an exemplary flowchart 1100 detailing a method for efficiently labeling data associated with an uncertain prediction and retraining a probabilistic model with newly annotated data. It is appreciated that flowchart 1100 may be simplified for purposes of this explanation.

The method of flowchart 1100 may include obtaining an uncertainty metric of an object, wherein the uncertainty metric describes a probability that the object occurs 1102. Determining an uncertainty metric threshold based on a previously trained version of the continuous learning model 1104. Comparing the uncertainty metric with the uncertainty metric threshold 1106. Determining an annotation method based on the comparison of the uncertainty metric and the uncertainty metric threshold 1108. Collecting data associated with the object 1110. Annotating the data to more accurately identify the object, according to the determined annotation method 1112. Retraining the model of the continuous learning device with the annotated data 1114.

FIG. 12 shows an exemplary flowchart 1200 detailing a method for calculating an uncertainty metric for an object. It is appreciated that flowchart 1200 may be simplified for purposes of this explanation.

The method of flowchart 1200 may include detecting a vehicle environment 1202. Obtaining a plurality of contextual variables from a plurality of auxiliary devices; wherein the plurality of contextual variables of interrelated conditions in which the vehicle exists 1204. Determining a plurality of objects within the vehicle's environment 1206. Determining the uncertainty metric of the at least one of the plurality of objects based on a probability that the at least one of the plurality of objects occurs given at least one of the plurality of contextual variables 1208.

FIG. 13 shows an exemplary flowchart 1300 detailing a method for calculating an uncertainty metric for an object and annotating it if the uncertainty metric does not satisfy a certainty threshold. It is appreciated that flowchart 1300 may be simplified for purposes of this explanation.

The method of flowchart 1300 may include detecting a vehicle environment 1302. Obtaining a plurality of contextual variables from plurality of auxiliary devices; wherein the plurality of contextual variables of interrelated conditions in which the vehicle exists 1304. Determining a plurality of objects within the vehicle's environment 1306. Determining the uncertainty metric of the at least one of the plurality of objects based on a probability that the at least one of the plurality of objects occurs given at least one of the plurality of contextual variables 1308. Comparing the uncertainty metric threshold based on a previously trained model of the continuous learning device 1310. Determining an annotation method based on the comparison of the uncertainty metric and the uncertainty metric threshold 1312. Collecting data associated with the object 1314. Annotating the data to more accurately identify of the object, according to the determined annotation method 1316. Retraining the model of the continuous learning device with the annotated data 1318.

In the following examples, various aspects of the present disclosure will be illustrated:

In Example 1, a perception device for a vehicle to determine an uncertainty metric of an object, the perception device including one or more processors configured to: detect a vehicle environment; obtain a plurality of contextual variables from a plurality of auxiliary devices; wherein the plurality of contextual variables of interrelated conditions in which the vehicle exists; determine a plurality of objects within the vehicle's environment; and determine the uncertainty metric of the at least one of the plurality of objects based on a probability that the at least one of the plurality of objects occurs given at least one of the plurality of contextual variables.

In Example 2, the subject matter of Example(s) 1, may include that the one or more processors are configured to implement a probabilistic model of the relationship between the plurality of objects and the plurality of contextual variables.

In Example 3, the subject matter of Example(s) 1 and 2, may include that the probabilistic model defines a joint distribution of the plurality of objects and the plurality of contextual variables.

In Example 4, the subject matter of Example(s) 1-3, may include that the probabilistic model comprises a Bayesian network.

In Example 5, the subject matter of Example(s) 1-4, may include that the probabilistic model comprises a Markov network.

In Example 6, the subject matter of Example(s) 1-5, may include that the plurality of contextual variables comprises a person ID.

In Example 7, the subject matter of Example(s) 1-6, may include that the plurality of contextual variables comprises an ego-location of the vehicle.

In Example 8, the subject matter of Example(s) 1-7, may include that the plurality of contextual variables comprises a date of the vehicle environment.

In Example 9, the subject matter of Example(s) 1-8, may include that the plurality of contextual variables comprises a time of the vehicle environment.

In Example 10, the subject matter of Example(s) 1-9, may include that the plurality of contextual variables comprises a weather of the vehicle environment.

In Example 11, the subject matter of Example(s) 1-10, may include that the plurality of contextual variables comprises a person ID.

In Example 12, the subject matter of Example(s) 1-11, may include that at least one of the plurality of objects further comprise a label, and may include that the label identifies the at least one of the plurality of objects.

In Example 13, the subject matter of Example(s) 1-12, may include that the plurality of objects further comprise a location of the vehicle environment.

In Example 14, the subject matter of Example(s) 1-13, may include that the plurality of objects further comprise a bounding box of at least of the plurality of objects.

In Example 15, the subject matter of Example(s) 1-14, may include that the probabilistic model may be trained for a person ID.

In Example 16, the subject matter of Example(s) 1-15, may include that the auxiliary devices comprise a time keeping device.

In Example 17, the subject matter of Example(s) 1-16, may include that the auxiliary devices comprise a light sensor.

In Example 18, the subject matter of Example(s) 1-17, may include an event camera to detect the vehicle's environment.

In Example 19, a detection device for a vehicle to determine an accuracy metric of an object, the detection device including one or more processors configured to: perceive a vehicle environment; obtain a plurality of contextual variables from a plurality of auxiliary devices; wherein the plurality of contextual variables of interrelated conditions in which the vehicle exists; determine a plurality of objects within the vehicle's environment; and determine the accuracy metric of the at least one of the plurality of objects based on a probability that the at least one of the plurality of objects occurs given at least one of the plurality of contextual variables, wherein the accuracy metric is compared to an accuracy metric threshold.

In Example 20, a method to determine an uncertainty metric of an object, the method including: detecting a vehicle environment; obtaining a plurality of contextual variables from a plurality of auxiliary devices, may include that the plurality of contextual variables of interrelated conditions in which the vehicle exists; determining a plurality of objects within the vehicle's environment; and determining the uncertainty metric of the at least one of the plurality of objects based on a probability that the at least one of the plurality of objects occurs given at least one of the plurality of contextual variables.

In Example 21, the subject matter of Example(s) 20, further comprising a probabilistic model of the relationship between the plurality of objects and the plurality of contextual variables.

In Example 22, the subject matter of Example(s) 20 and 21, may include that the probabilistic model defines a joint distribution of the plurality of objects and the plurality of contextual variables In Example 23, the subject matter of Example(s) 20-22, may include that the probabilistic model comprises a Bayesian network.

In Example 24, the subject matter of Example(s) 20-23, may include that the probabilistic model comprises a Markov network.

In Example 25, the subject matter of Example(s) 20-24, may include that the plurality of contextual variables comprises a person ID.

In Example 26, the subject matter of Example(s) 20-25, may include that the plurality of contextual variables comprises an ego-location of the vehicle.

In Example 27, the subject matter of Example(s) 20-26, may include that the plurality of contextual variables comprises a date of the detected vehicle environment.

In Example 28, the subject matter of Example(s) 20-27, may include that the plurality of contextual variables comprises a time of the detected vehicle environment.

In Example 29, the subject matter of Example(s) 20-28, may include that the plurality of contextual variables comprises a weather of the detected vehicle environment.

In Example 30, the subject matter of Example(s) 20-29, may include that the plurality of contextual variables comprises a person ID.

In Example 31, the subject matter of Example(s) 20-30, may include that at least one of the plurality of objects further comprise a label, may include that the label identifies the at least one of the plurality of objects.

In Example 32, the subject matter of Example(s) 20-31, may include that the plurality of objects further comprise a location of the vehicle environment.

In Example 33, the subject matter of Example(s) 20-32, may include that the plurality of objects further comprise a bounding box of at least one of the plurality of objects.

In Example 34, the subject matter of Example(s) 20-33, may include that the probabilistic model may be trained for a person ID.

In Example 35, one or more non-transitory computer readable media comprising programmable instructions thereon, that when executed by one or more processors of a device, cause the device to perform any one of the method of Examples 20-35.

In Example 36, a system comprising one or more devices according to any of Examples 1-19, the system configured to implement a method according to any of Examples 20-34.

In Example 37, a means for implementing any of the Examples 1-19.

In Example 38, a device for a vehicle to incorporate annotated data, the device comprising one or more processors configured to: obtain an uncertainty metric of an object, may include that the uncertainty metric describes a probability that the object occurs; determine an uncertainty metric threshold based on a previously trained model of the continuous learning device; compare the uncertainty metric with the uncertainty metric threshold; determine an annotation method based on the comparison of the uncertainty metric and the uncertainty metric threshold; collect data associated with the object; annotate the data to more accurately identify of the object, according to the determined annotation method; and retrain the model of the continuous learning device with the annotated data.

In Example 39, the subject matter of Example(s) 38, may include that the uncertainty metric is associated with high level of uncertainty that the object comprises a correct identification.

In Example 40, the subject matter of Example(s) 38, may include that the uncertainty metric is associated with low level of uncertainty that the object comprises a correct identification.

In Example 41, the subject matter of Example(s) 38-40, may include that the model of the continuous learning device is stored remotely.

In Example 42, the subject matter of Example(s) 38-41, may include that the uncertainty metric threshold comprises a determination of the probability of the object according to the previously trained model.

In Example 43, the subject matter of Example(s) 38-42, may include that the previously trained model comprises a neural network.

In Example 44, a device for a vehicle to incorporate annotated data, the device comprising one or more processors configured to: obtain an uncertainty metric of an object, may include that the uncertainty metric describes a probability that the object occurs; determine an uncertainty metric threshold based on a previously trained model of the continuous learning device; compare the uncertainty metric with the uncertainty metric threshold; determine an annotation method based on the comparison of the uncertainty metric and the uncertainty metric threshold; collect data associated with the object; annotate the data to more accurately identify of the object, according to the determined annotation method; and retrain the model of the continuous learning device with the annotated data.

In Example 45, a method to incorporate annotated data into a model comprising: obtaining an uncertainty metric of an object, may include that the uncertainty metric describes a probability that the object occurs; determining an uncertainty metric threshold based on a previously trained version of the continuous learning model; comparing the uncertainty metric with the uncertainty metric threshold; determining an annotation method based on the comparison of the uncertainty metric and the uncertainty metric threshold; collecting data associated with the object; annotating the data to more accurately identify the object, according to the determined annotation method; and retraining the model of the continuous learning device with the annotated data.

In Example 46, the subject matter of Example(s) 45, may include that the uncertainty metric is associated with high level of uncertainty that the object is identified correctly.

In Example 47, the subject matter of Example(s) 45, may include that the uncertainty metric is associated with low level of uncertainty that the object is identified correctly.

In Example 48, the subject matter of Example(s) 45-47, may include that the model of the continuous learning device is stored remotely.

In Example 49, the subject matter of Example(s) 45-48, may include that the retrained model is transmitted from a network infrastructure.

In Example 50, the subject matter of Example(s) 45-49, may include that the retrained model is received at the vehicle.

In Example 51, the subject matter of Example(s) 45-50, may include that the uncertainty metric threshold comprises a determination of the probability of the object according to the previously trained model.

In Example 52, the subject matter of Example(s) 45-51, may include that the previously trained model comprises a neural network.

In Example 53, one or more non-transitory computer readable media comprising programmable instructions thereon, that when executed by one or more processors of a device, cause the device to perform any one of the method of Examples 45-52.

In Example 54, a system comprising one or more devices according to any of Examples 38-44, the system configured to implement a method according to any of Examples 45-52.

In Example 55, a means for implementing any of the Examples 38-44.

In Example 56, a device for a vehicle to incorporate annotated data, the device comprising one or more processors configured to: detect a vehicle environment; obtain a plurality of contextual variables from plurality of auxiliary devices; may include that the plurality of contextual variables of interrelated conditions in which the vehicle exists; determine a plurality of objects within the vehicle's environment; and determine the uncertainty metric of the at least one of the plurality of objects based on a probability that the at least one of the plurality of objects occurs given at least one of the plurality of contextual variables; determine an uncertainty metric threshold based on a previously trained model of the continuous learning device; compare the uncertainty metric with the uncertainty metric threshold; determine an annotation method based on the comparison of the uncertainty metric and the uncertainty metric threshold; collect data associated with the object; annotate the data to more accurately identify of the object, according to the determined annotation method; and retrain the model of the continuous learning device with the annotated data.

In Example 57, the subject matter of Example(s) 56, further implementing any of Examples 2-18, 39-43, and 46-52.

In Example 58, the subject matter of Example(s) 56, further including determining the uncertainty metric threshold based on a measure of accuracy of the previously trained model and a measure of uncertainty of the previously trained model.

In Example, 49, the subject matter of Example(s) 58, further including determining the uncertainty metric threshold based on a reaction of a count of accurate and certain predictions plus a count of inaccurate and uncertain predictions to a count of all predictions.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A perception device for a vehicle to determine an uncertainty metric of an object, the perception device comprising one or more processors configured to:
   detect a vehicle environment;
   obtain a plurality of contextual variables from a plurality of auxiliary devices; wherein the plurality of contextual variables are of interrelated conditions in which the vehicle exists;
   determine a plurality of objects within the vehicle environment;
   determine the uncertainty metric of the at least one of the plurality of objects based on a probability that the at least one of the plurality of objects occurs given at least one of the plurality of contextual variables; and implement a probabilistic model of a relationship between the plurality of objects and the plurality of contextual variables.

2. The device of claim 1, further comprising an event camera to detect the vehicle environment.

3. The device of claim 1, wherein the probabilistic model defines a joint distribution of the plurality of objects and the plurality of contextual variables.

4. The device of claim 1, wherein the plurality of contextual variables comprises a person ID.

5. The device of claim 1, wherein the plurality of contextual variables comprises an ego-location of the vehicle.

6. The device of claim 1, wherein the plurality of contextual variables comprises a date of the vehicle environment.

7. The device of claim 1, wherein the plurality of contextual variables comprises a time of the vehicle environment.

8. The device of claim 1, wherein at least one of the plurality of objects further comprises a label, wherein the label identifies the at least one of the plurality of objects.

9. The device of claim 1, wherein at least one of the auxiliary devices comprises a light sensor.

10. A method to determine an uncertainty metric of an object, the method comprising:
  detecting a vehicle environment;
  obtaining a plurality of contextual variables from a plurality of auxiliary devices, wherein the plurality of contextual variables are of interrelated conditions in which the vehicle exists;
  determining a plurality of objects within the vehicle environment; and
  determining the uncertainty metric of the at least one of the plurality of objects based on a probability that the at least one of the plurality of objects occurs given at least one of the plurality of contextual variables, wherein determining the uncertainty metric comprises using a probabilistic model of a relationship between the plurality of objects and the plurality of contextual variables.

11. The method of claim 10, wherein the probabilistic model defines a joint distribution of the plurality of objects and the plurality of contextual variables.

12. A device for a vehicle to incorporate annotated data, the device comprising one or more processors configured to:
  obtain an uncertainty metric of an object, wherein the uncertainty metric describes a probability that the object occurs;
  determine an uncertainty metric threshold based on a previously trained model of the continuous learning device;
  compare the uncertainty metric with the uncertainty metric threshold;
  determine an annotation method based on the comparison of the uncertainty metric and the uncertainty metric threshold;
  collect data associated with the object;
  annotate, according to the determined annotation method, the data to more accurately identify the object; and
  retrain the model of the continuous learning device with the annotated data.

13. The device of claim 12, wherein the previously trained model comprises a neural network.

14. The device of claim 12, wherein the retrained model is received at the vehicle.

15. The device of claim 12, wherein the uncertainty metric is associated with high level of uncertainty that the object comprises a correct identification.

16. The device of claim 12, wherein the uncertainty metric is associated with low level of uncertainty that the object comprises a correct identification.

17. The device of claim 12, wherein the model of the continuous learning device is stored remotely.

18. The device of claim 12, wherein the uncertainty metric threshold comprises a determination of the probability of the object according to the previously trained model.

* * * * *